United States Patent
Liu et al.

(10) Patent No.: US 10,030,429 B2
(45) Date of Patent: Jul. 24, 2018

(54) BUMPER STOP OF A VEHICLE STRUCTURAL MEMBER AND A RESTRAINT ASSEMBLY

(71) Applicant: Ford Global Technologies, LLC, Dearborn, MI (US)

(72) Inventors: Jonas Liu, Nanjing (CN); Cliff Ruan, Nanjing (CN); Peter Zhang, Nanjing (CN)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/624,364

(22) Filed: Jun. 15, 2017

(65) Prior Publication Data

US 2017/0370141 A1     Dec. 28, 2017

(30) Foreign Application Priority Data

Jun. 22, 2016   (CN) .......................... 2016 1 0460315

(51) Int. Cl.
*E05F 5/02*     (2006.01)
*B60J 5/10*     (2006.01)
*B62D 25/12*    (2006.01)

(52) U.S. Cl.
CPC .............. *E05F 5/022* (2013.01); *B60J 5/101* (2013.01); *E05Y 2600/528* (2013.01); *E05Y 2600/53* (2013.01); *E05Y 2600/56* (2013.01); *E05Y 2900/548* (2013.01)

(58) Field of Classification Search
CPC .......... E05F 5/022; B60J 5/101; B62D 25/10; B62D 25/12; E05Y 2600/528; E05Y 2600/53; E05Y 2600/56; E05Y 2900/548

USPC ................ 296/76, 152, 207; 16/86 A, 86 R, 16/DIG. 6, 82

See application file for complete search history.

(56) References Cited

U.S. PATENT DOCUMENTS

| | | | |
|---|---|---|---|
| 5,044,852 A * | 9/1991 | Sweeney ............... | F16B 13/143 248/205.3 |
| 5,482,348 A | 1/1996 | Mass et al. | |
| 6,039,388 A * | 3/2000 | Choi ....................... | E05F 5/022 16/86 R |
| 6,119,306 A | 9/2000 | Antonucci et al. | |
| 7,618,088 B2 | 11/2009 | Bauer | |
| 7,690,722 B2 | 4/2010 | Boggess | |
| 7,896,601 B2 * | 3/2011 | Kalyanadurga ....... | F16B 21/084 411/508 |

(Continued)

FOREIGN PATENT DOCUMENTS

| | | |
|---|---|---|
| DE | 102006061611 | 7/2008 |
| DE | 102009022807 | 12/2010 |
| JP | 09144737 | 6/1997 |

*Primary Examiner* — Gregory A Blankenship
(74) *Attorney, Agent, or Firm* — Vichit Chea; Mohr IP Law Solutions, PC

(57) ABSTRACT

The present disclosure provides a bumper stop for a vehicle structural member. The bumper stop includes a main body having a supporting surface, an assembling surface opposite to the supporting surface and a side surface between the supporting surface and the assembling surface; and a hollow conical portion partially surrounding the side surface of the main body and connected to the main body along a perimeter of the main body. The hollow conical portion is made from elastic material and configured to be flipped from a first position to a second position.

20 Claims, 4 Drawing Sheets

(56) References Cited

U.S. PATENT DOCUMENTS

| | | | | |
|---|---|---|---|---|
| 8,677,563 B2* | 3/2014 | Diep | ............... | E05F 5/08 |
| | | | | 16/82 |
| 9,290,979 B1* | 3/2016 | Alexander | ............... | E05F 5/022 |
| 2006/0180964 A1* | 8/2006 | Siemer | ............... | E05F 5/022 |
| | | | | 267/140 |
| 2007/0234527 A1* | 10/2007 | Aoyama | ............... | E05F 5/022 |
| | | | | 24/297 |
| 2014/0091600 A1* | 4/2014 | Lusky | ............... | E05F 5/022 |
| | | | | 296/207 |
| 2015/0337585 A1* | 11/2015 | Diep | ............... | E05F 5/022 |
| | | | | 16/86 A |
| 2017/0370141 A1* | 12/2017 | Liu | ............... | B60J 5/101 |

* cited by examiner

BUMPER STOP OF A VEHICLE STRUCTURAL MEMBER AND A RESTRAINT ASSEMBLY

RELATED APPLICATION

This application claims the benefit of Chinese Patent Application No.: CN 201610460315.3 filed on Jun. 22, 2016, the entire contents thereof being incorporated herein by reference.

FIELD

The present disclosure relates to a bumper stop of a vehicle structural member and a restraint assembly.

BACKGROUND

In a vehicle, a bumper stop is often positioned between the vehicle structural members to reduce the vibration or shock. For example, a bumper stop is positioned on a trunk lid of the vehicle to damp shocking when closing the trunk lid. Further, for aesthetic and sound proofing consideration, an inner surface of the trunk lid is often disposed with a trim member, such as a layer foamed material. The trim member includes an opening to let a bumper stop pass through. The size of the opening of the trim member is usually greater than a cross-sectional area of the bumper stop for ease of assembling, thus the visible gap between the bumper stop and the opening exists which is not aesthetically pleasing once assembled.

SUMMARY

According to one aspect of the present disclosure, a bumper stop of a vehicle structural member is provided. The bumper includes a main body having a supporting surface, an assembling surface opposite to the supporting surface and a side surface between the supporting surface and the assembling surface; and a hollow conical portion surrounding the side surface of the main body and connected to the main body. The hollow conical portion is configured to be capable of being flipped to from a first position to a second position.

In one embodiment, the hollow conical portion includes a first surface and a second surface opposite to the first surface. The first surface is closer to the side surface than the second surface at the first position, and the second surface is closer to the side surface than the first surface at the second position.

In another embodiment, the first surface forms an inner surface of the hollow conical portion and defines a first receiving space at the first portion, and the second surface forms an inner surface of the hollow conical portion and defines a second receiving space at the second portion.

In another embodiment, a portion of the main body adjacent to the assembly surface is at least partially received in the second receiving space at the second position.

In another embodiment, the bumper further includes a fixing portion extending from the assembling surface of the main body to be mounted to the vehicle structural member.

In another embodiment, a thread area is formed on a side surface of the fixing portion.

In another embodiment, the main body and the hollow conical portion are made from rubber materials and are integrally formed.

In another embodiment, a thickness of the hollow conical portion decreases gradually in a direction away from the main body.

According to another aspect of the disclosure, a bumper stop of a vehicle is provided. The bumper stop includes a main body having a supporting surface, an assembling surface opposite to the supporting surface and a side surface between the supporting surface and the assembling surface; and a hollow conical portion. The hollow conical portion is connected to the main body around a perimeter of side surface of the main body and is capable of flipped from a first position to a second position. The hollow conical opens toward to the supporting surface at the first position and opens toward to the assembling surface at the second position, and the hollow conical portion is formed of elastic materials.

In one embodiment, the hollow conical portion covers a portion of the main body adjacent to the assembling surface at the second position.

In another embodiment, the hollow conical portion may be deformable under an external force and be restored when the external force is removed.

According to yet another aspect of the disclosure, a restraint assembly of a vehicle is provided. The restraint assembly includes a vehicle structural member having a surface; a bumper stop assembled to the vehicle structural member and including a main body and a hollow conical portion; and a trim member assembled to the surface of the vehicle structural member and including a through-hole through which the bumper stop passes. The main body of the bumper stop includes a supporting surface, an assembling surface opposite to the supporting surface and assembled to the surface of the vehicle structural member, and a side surface between the supporting surface and the assembling surface. The hollow conical portion is connected to the side surface of the main body along a perimeter of the main body and configured to be flipped from a pre-assembled position to an assembled position. A projection area of the hollow conical portion on the trim member is larger than an area of the through hole.

In one embodiment, the hollow conical portion includes an opening toward the assembling surface at the assembled position, and the through hole of the trim member is covered by the hollow conical portion.

In another embodiment, a free end of the hollow conical portion substantially contacts the trim member at the assembled position.

In another embodiment, the hollow conical portion opens toward a direction away from the assembling surface at a pre-assembled position and opens toward the assembling surface at the assembled position.

In another embodiment, a cross-sectional area of an open end of the conical portion is larger than an area of the through-hole of the trim member, and a place with which the hollow conical portion connecting the side surface is closer to the supporting surface.

In another embodiment, a cross-sectional area of an open end of the conical portion is smaller than an area of the through-hole of the trim member, and a place with which the hollow conical portion connecting with the side surface is closer to the assembling surface.

In another embodiment, the main body of the bumper stop is of cylindrical shape, and the hollow conical portion is a hollow frustum cone.

In another embodiment, the vehicle structural member further includes an assembling hole to receive the bumper stop, wherein the bumper stop further includes a fixing portion extending from the assembling surface of the main body to be received in the assembling hole.

In another embodiment, the vehicle structural member is a trunk lid.

In another embodiment, the hollow conical portion is integrally with the main body and is made of elastic materials.

In another embodiment, a thickness of the hollow conical becomes smaller in a direction away from the main body.

One or more advantageous features as described herein are believed to be readily apparent from the following detailed description of one or more embodiments when taken in connection with the accompanying drawings.

BRIEF DESCRIPTION OF THE DRAWINGS

For more complete understanding of one or more embodiments of the present invention, reference is now made to the one or more embodiments illustrated in greater detail in the accompanying drawings and described below.

DETAILED DESCRIPTION

As required, detailed embodiments of the present invention are only disclosed herein; however, it is to be understood that the disclosed embodiments are merely exemplary of the invention that may be embodied in various and alternative forms. The figures are not necessarily scaled; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
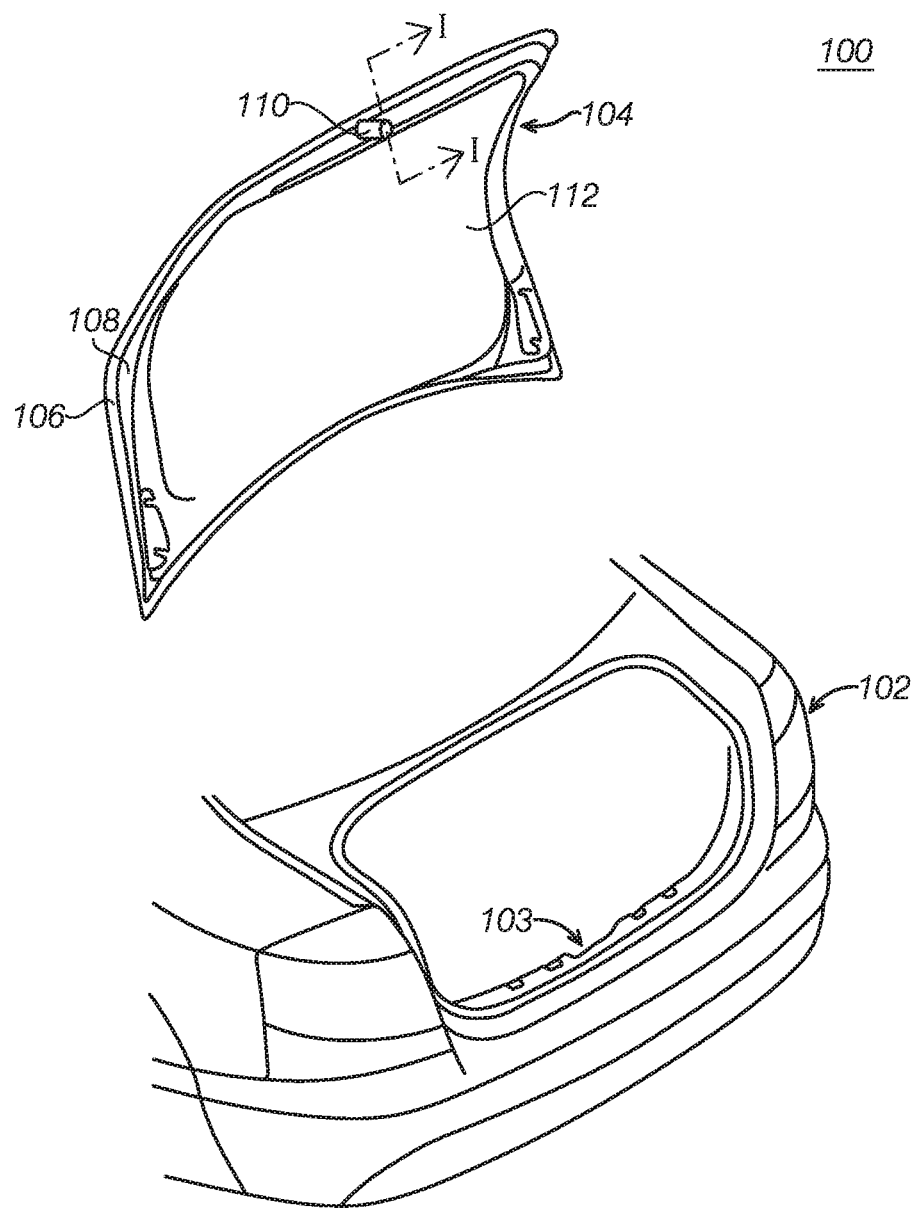
FIG. 1 depicts a partial view of a vehicle according to one or more embodiments of the present disclosure.

FIG. 1 depicts a partial exploded view of a back of a vehicle 100 according to one or more embodiments of the present disclosure, illustrating a trunk 102 at an open position. A bumper stop is often employed to reduce vibration between the vehicle structural members during an operation. In one or more embodiments as illustrated in FIG. 1, the vehicle 100 includes the trunk 102 and a restraint assembly 104 connected to the trunk 102 for covering the trunk 102. The restraint assembly 104 may include a vehicle structural member 106 having a surface 108, a bumper stop 110 assembled on the vehicle structural member 106 and a trim member 112 disposed on a surface 108 of the vehicle structural member 106. In the depicted embodiment, the vehicle structural member is a trunk lid and the trim member 112 may be a decoration layer to cover the inner surface of the trunk lid.

Figure 2:
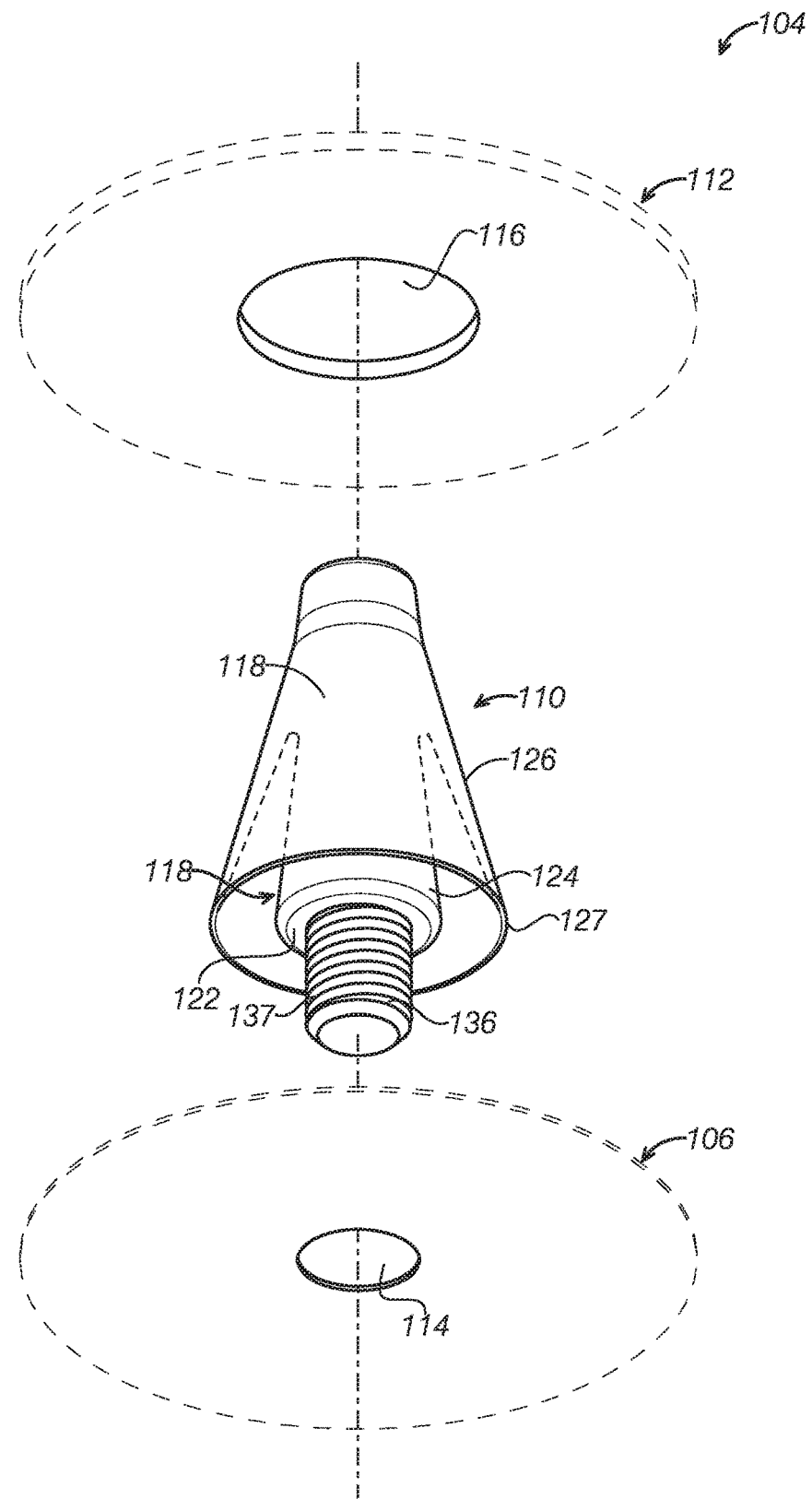
FIG. 2 depicts an exploded perspective view of the restraint assembly referenced in FIG. 1.
Figure 3A:
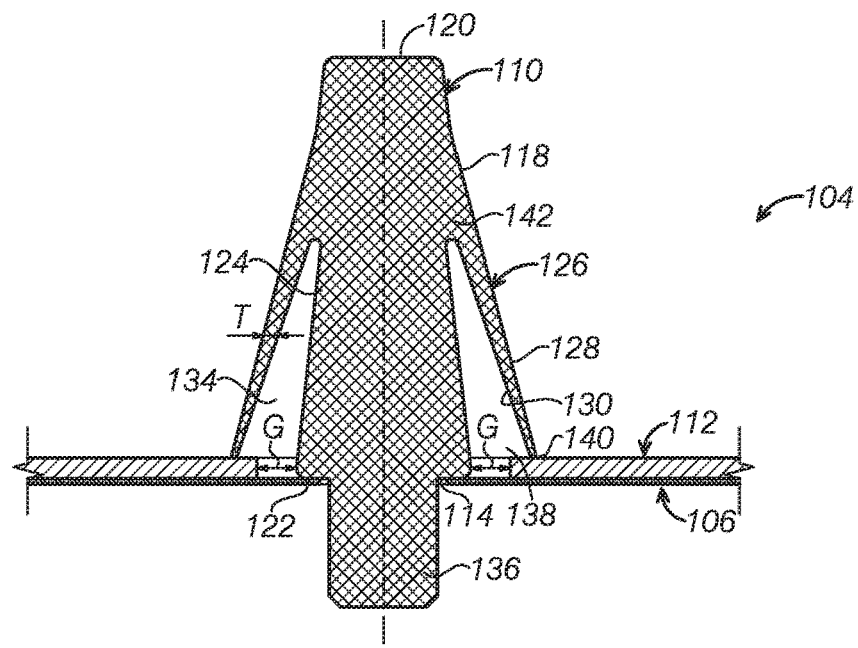
FIG. 3A depicts a cross-sectional view of the restraint assembly along I-I line referenced in FIG. 1 at an assembled position.
Figure 3B:
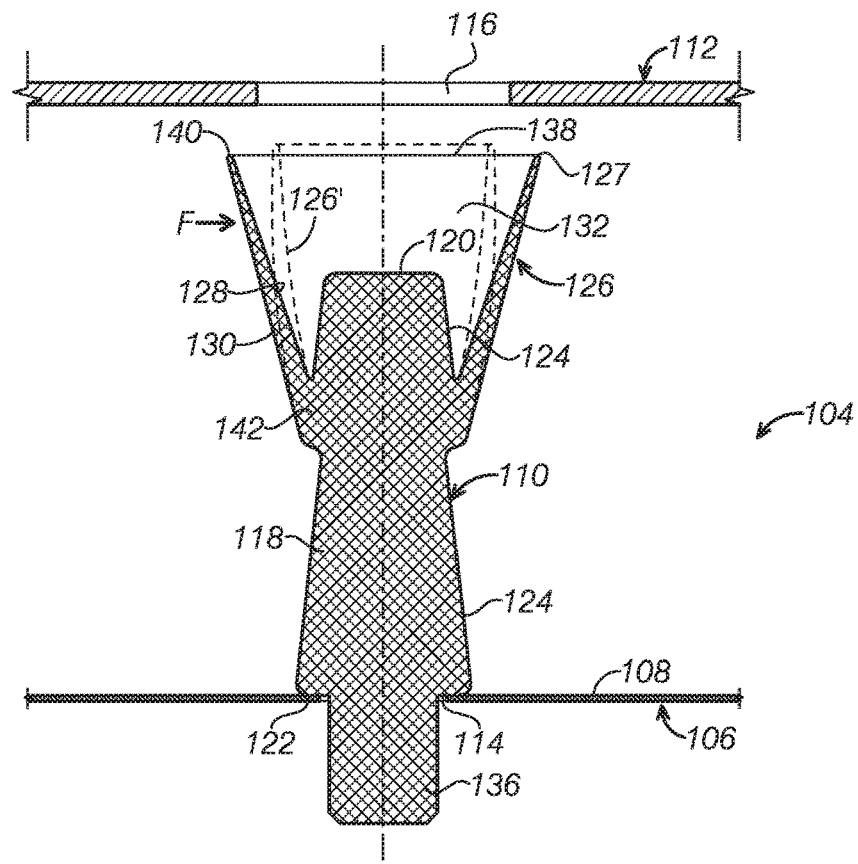
FIG. 3B depicts a cross-sectional view of the restraint assembly referenced in FIG. 1 at a pre-assembled position.

Referring to FIG. 2 and FIG. 3A-3B, FIG. 2 depicts an exploded perspective view of the restraint assembly 104 in FIG. 1. FIG. 3A depicts a cross-sectional view of the restraint assembly 104 along I-I line referenced in FIG. 1 at an assembled position. FIG. 3B depicts a cross-sectional view of the restraint assembly referenced in FIG. 1 at a pre-assembled position. In one or more embodiments, the restraint assembly 104 may be a trunk lid assembly, and the vehicle structural member 106 may be a trunk lid. The restraint assembly 104 may be connected to the trunk 102 via a fastener or any other appropriate mechanisms, and cover the trunk 102 at a closed position. The bumper stop 110 positioned on the trunk lid 106 may consist of elastic material such that the vibration and/or shock caused by contacting an end portion 103 of the trunk 102 with the truck lid 106 can be reduced when closing the trunk lid 106.

In one or more embodiments, the vehicle structural member 106 may be made from metallic material and include an assembling hole 114 for the bumper stop 110. The trim member 112 may be made from material including foam material and include a through hole 116 to allow the bumper stop 110 pass through. The bumper stop 110 includes a main body 118 having a supporting surface 120 to contact the end portion 103 of the trunk 102, an assembling surface 122 opposite to the supporting surface 120 and to be connected to a surface 108 of the vehicle structural member 106, and a side surface 124 positioned between the supporting surface 120 and the assembling surface 122. Further, the bumper stop 110 may include a hollow conical portion 126 connected to a side surface 124 of the main body 118 and is capable of being flipped from one position to another position. In one or more embodiments, the hollow conical portion 126 surrounds the side surface 124 of the main body 118 and is connected to the main body 118 along a perimeter of the main body 118. The hollow conical portion 126 may be flipped from a first position to a second position.

As illustrated in FIGS. 3A and 3B, the hollow conical portion 126 includes a first surface 128 and a second surface 130 opposite to the first surface 128. The first surface 128 is closer to the side surface 124 than the second surface 130 at a first position or a pre-assembled position as shown in FIG. 3B. That is, the first surface 128 is an inner surface of the hollow conical portion 126 at the pre-assembled position. The second surface 130 is closer to the side surface 124 than the first surface 128 at a second position or an assembled position as shown in FIG. 3A. That is, the second surface is an inner surface of the hollow conical portion 126 at the assembled position. Further, the first surface 128 defines a first receiving space 132 at the first position, and the second surface 130 defines a second receiving space 134 at the second position. In one or more embodiments, the supporting surface 120 is positioned within the first receiving space 132 at the first position, and the main body 118 adjacent to the assemble surface 122 is at least partially positioned in the second receiving space 134 at the second position.

The hollow conical portion 126 further includes an opening 138. The opening 138 of the hollow conical portion 126 opens to the supporting surface 120 at the pre-assembled position as illustrated in FIG. 3B and opens toward the assembling surface 122 at the assembled position as illustrated in FIG. 3A. At the assembled position, a free end portion 140 of the hollow conical portion 126 may substantially contact the trim member 112. The term of "substantially contact" refers that the free end portion 140 of the conical portion 126 contacts the trim member 112 or has a small gap with the trim member 112 without affecting the integrity of the appearance of the restraint assembly 104. The hollow conical portion 126 may be formed from elastic material, for example, including but not limited to rubber material such that the hollow conical portion 126 may be deformable under an external force F (e.g., decrease in size at a radial direction for example) and be restored to an original shape when the external force F is removed. Further, a thickness T of the conical portion 126 may be configured to decrease gradually in a direction away from the main body 118 to facilitate the flipping the hollow conical portion 126 from the first position to the second position. In one or more embodiments, the hollow conical portion 126 and the main body 118 may be integrally formed and made from rubber material. Thus, a connecting member to join the main body 118 and the conical portion 126 may be omitted.

The bumper stop 110 may further include a fixing portion 136 extending from the assembling surface 122 and to be assembled to the assembling hole 114 of the vehicle structural member 106. In one or more embodiments, an outer side surface of the fixing portion 136 may include a thread area 137 as shown in FIG. 2, and the assembling hole 114 of the structural member 106 may include a corresponding thread. In one or more embodiments, the main body 118 of the bumper stop 110 may be a solid cylinder or may be a solid conical frustum, and the hollow conical portion 126 may be a hollow conic frustum. In one or more embodiments, the main body 118 of the bumper stop 110 may be a solid frustum of a pyramid, and the hollow conical portion 126 may be a hollow frustum of pyramid. However, the shape of the bumper and the conical portion may be varied as needed without departing the scope of the present disclosure.

Referring to FIG. 3B, a cross-sectional view the bumper stop 110 at a pre-assembled position is illustrated. At the pre-assembled position, the bumper stop 110 has been installed into the assembling hole 114 of the vehicle structural member 106 via the fixing portion 136 while the trim member 112 has not been assembled to the vehicle structural member 106. At the pre-assembled position, the hollow conical portion 126 is at a first position, that is, the opening 138 of the conical portion 126 toward the supporting surface 120 of the main body 118. A projection area of the hollow conical portion 126 on the trim member 112 may be configured to be larger than an area of the through hole 116 so that the through hole 116 is covered by the hollow conical portion. In one or more embodiments, a cross-sectional area of an opening end portion 127 of the conical portion 126 is larger than the area of the through hole 116 of the trim member 112 such that an external force F is needed to deform the hollow conical portion 126 to pass through the through hole 116 of the trim member 112. The deformed hollow conical portion 126' is shown in FIG. 3B in dash line. Since the conical portion 126 is made of elastic material and the thickness of the conical portion 126 gradually becomes smaller in a direction away from the main body 118, it may not necessary to deform the conical portion 126 via a great force, and assembling efficient may be improved.

As illustrated in FIG. 3A, to facilitate assembling the trim member 112 to the vehicle structural member 106, the size of the through hole 116 of the trim member 112 needs to be larger than the maximum cross-sectional area of the main body 118 of the bumper 110. Thus, a gap exists between the through hole 116 of the trim member and the bumper stop 110, which affects the appearance the vehicle assembly. The hollow conical portion 126 may be flipped or turned over from the first position to the second position after the trim member 112 being assembled to the vehicle structural member 106. At the second position, the second surface 130 of the hollow conical portion 126 defines a second receiving space 134, and at least portion of the main body 118 adjacent to the assembling surface 122 is positioned within the second receiving space 134 and thus covered by the hollow conical portion 126. Further, the projection area of the opening 138 of the hollow conical portion 126 on the trim member 112 is larger than the area of the through hole 116 at the second position, and the free end portion 140 of the hollow conical portion 126 substantially contact the trim member 126 at the assembled position. Thus, the hollow conical portion 126 may cover the gap G between the through hole 116 of the trim member 126 and the main body 118 of the bumper stop 110 at the assembled position. In one or more embodiments, the place connecting the conical portion 126 and the side surface 124 is closer to the supporting surface 120 than the assembling surface 122.

Figure 4A:
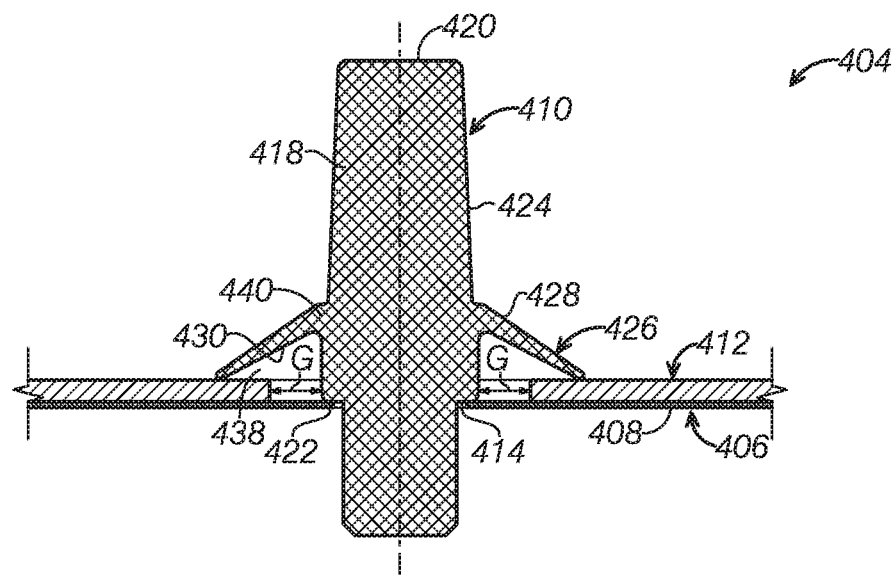
FIG. 4A depicts a cross-sectional view of a restraint assembly according to another embodiment at the assembled position.
Figure 4B:
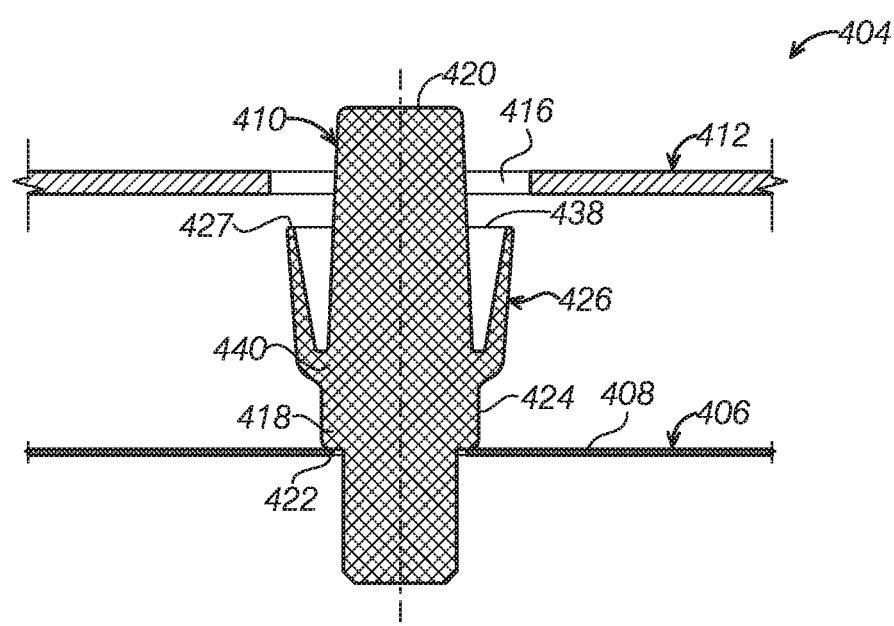
FIG. 4B depicts a cross-sectional view of the restraint assembly referenced in FIG. 4A at a pre-assembled position.

FIG. 4A and FIG. 4B depict a restraint assembly according to another embodiment of the present disclosure. FIG. 4A depicts a cross-sectional view of a restraint assembly 404 at the assembled position. FIG. 4B depicts a cross-sectional view of the restraint assembly 404 at a pre-assembled position. The restraint assembly 404 referenced in FIG. 4A and FIG. 4B may include a vehicle structural member 406 having a surface 408, a bumper stop 410 assembled to the vehicle structural member 406, and a trim member 416 assembled to the surface 408 of the vehicle structural member 406.

In one or more embodiments, the vehicle structural member 406 may be made of metallic material and include an assembling hole 414 to receive the bumper stop 410. The trim member 412 may be made of decoration material such as foam material and include a through hole 416 to allow the bumper 410 pass through. The bumper stop 410 may include a main body 418 having a supporting surface 420 to contact an end portion 103 of the trunk 102, an assembling surface 422 opposite to the supporting surface 420 and to be assembled to the surface 408 of the vehicle structural member 406, and a side surface 424 positioned between the supporting surface 420 and the assembling surface 422. Further, the bumper stop 410 may include a hollow conical portion 426 connected to the side surface 424 of the main body 418 along a perimeter of the main body 418 and surrounding the side surface 424 of the main body 418. The conical portion 426 may be flipped from a first position shown in FIG. 4B to a second position shown in FIG. 4A.

The hollow conical portion 426 includes a first surface 428 and a second surface 430 opposite to the first surface 428. The hollow conical portion 426 further includes an opening 438. The opening 438 of the conical portion 426 opens toward the supporting surface 420 at the pre-assembled position as illustrated in FIG. 4B and toward the assembling surface 422 at the assembled position as illustrated in FIG. 4A. A cross-sectional area of an end portion of the opening 438 of the hollow conical portion 426 at the first position may be configured to be smaller than an area of the through hole 416 such that the trim member 412 may be assembled to the vehicle structural member 406 without squeezing the hollow conical portion 426 by an operator, thus the assembling efficiency may be improved. The hollow conical portion 426 may be flipped from the first position to the second position after the trim member 412 is assembled to the vehicle structural member 406. Further, the size of the end portion of the opening 438 of the conical portion 426 at the second position may be configured to be larger than the through hole 416 of the trim member 412 such that the hollow conical portion 426 may cover the gap G between the through hole 416 of the trim member 412 and the main body 418. In one or more embodiments, the place 400 connecting the hollow conical portion 426 and the side surface 424 may be closer to the assembling surface 422 than the supporting surface 420 such that the conical portion 426 more easily contacts the trim member 412 at the second position.

The bumper stop and the restraint assembly of the present disclosure can cover a gap between the bumper stop and a trim member and thus provide better appearance of a trunk lid. Further, the bumper stop is simple in structure and easy to be assembled.

While the present invention has been disclosed in a particular form, the specific embodiments disclosed and illustrated above are not to be considered in a limiting sense as numerous variations are possible. The subject matter of the invention includes all novel and non-obvious combinations and sub-combinations of the various elements, features, functions and/or properties disclosed above and inherent to those skilled in the art pertaining to such inventions. Those skilled in the art will understand that the disclosed examples may be varied, modified, and altered without departing from the scope of the inventions described herein.

The invention claimed is:

1. A bumper stop for a vehicle structural member, comprising:
   a main body having a supporting surface, an assembling surface opposite to the supporting surface and a side surface between the supporting surface and the assembling surface; and
   a hollow conical portion connected to the main body and surrounding the side surface of the main body, wherein the hollow conical portion is capable of being flipped from a first position to a second position.

2. The bumper stop of claim 1, wherein the hollow conical portion includes a first surface and a second surface opposite to the first surface, the first surface is closer to the side surface than the second surface at the first position, and the second surface is closer to the side surface than the first surface at the second position.

3. The bumper stop of claim 1, wherein the first surface forms an inner surface of the hollow conical portion and define a first receiving space at the first position, and the second surface forms an inner surface of the hollow conical portion and defines a second receiving space at the second position.

4. The bumper stop of claim 3, wherein a portion of the main body adjacent to the assembling surface is received in the second receiving space at the second position.

5. The bumper stop of claim 1, further comprising a fixing portion extending from the assembling surface of the main body to be mounted to the vehicle structural member.

6. The bumper stop of claim 5, wherein a thread area is formed on a side surface of the fixing portion.

7. The bumper stop of claim 1, wherein the main body and the hollow conical portion are made from rubber material and are integrally formed.

8. The bumper stop of claim 1, wherein a thickness of the hollow conical portion decreases gradually in a direction away from the main body.

9. A bumper stop of a vehicle structural member, comprising:
   a main body having a supporting surface, an assembling surface opposite to the supporting surface and a side surface between the supporting surface and the assembling surface; and
   a hollow conical portion, wherein the hollow conical portion partially surrounds the side surface of the main body and is connected to the main body around a perimeter of the side surface of the main body and is capable of being flipped from a first position to a second position, wherein the hollow conical portion opens toward the supporting surface at the first position and opens toward the assembling surface at the second position, and the hollow conical portion is made from elastic materials.

10. The bumper stop of claim 9, wherein the hollow conical portion covers a portion of the main body adjacent to the assembling surface at the second position.

11. The bumper stop of the claim 9, wherein the hollow conical portion is deformable under an external force and is restored when the external force is removed.

12. A restraint assembly of a vehicle, comprising:
    a vehicle structural member having a surface;
    a bumper stop assembled to the vehicle structural member, including:
      a main body having a supporting surface, an assembling surface opposite to the supporting surface and assembled to the surface of the vehicle structural member, and a side surface between the supporting surface and the assembling surface, and
      a hollow conical portion connected to the side surface of the main body along a perimeter of the main body and configured to be flipped from a pre-assembly position to an assembled position; and
    a trim member assembled to the surface of the vehicle structural member and including a through-hole through which the bumper stop passes;
    wherein a projection area of the hollow conical portion on the trim member is larger than an area of the through hole.

13. The restraint assembly of claim 12, wherein a free end of the hollow conical portion substantially contacts the trim member at an assembled position.

14. The restraint assembly of claim 12, wherein the hollow conical portion is made of elastic material.

15. The restraint assembly of claim 14, wherein the hollow conical portion opens toward a direction away from the assembling surface at the pre-assembled position and opens toward the assembling surface at the assembled position.

16. The restraint assembly of claim 15, wherein a cross-sectional area of an open end of the conical portion is larger than an area of the through-hole of the trim member, and a place with which the hollow conical portion connecting the side surface is closer to the supporting surface.

17. The restraint assembly of claim 15, wherein a cross-sectional area of an open end of the conical portion is smaller than an area of the through-hole of the trim member, and a place with which the conical portion connecting the side surface is closer to the assembling surface.

18. The restraint assembly of claim 12, wherein the main body of the bumper stop is of cylindrical shape, and the hollow conical portion is a hollow frustum of cone.

19. The restraint assembly of claim 12, wherein the vehicle structural member further includes an assembling hole to receive the bumper stop, wherein the bumper stop further includes a fixing portion extending from the assembling surface of the main body to be received in the assembling hole.

20. The restraint assembly of claim 12, wherein the vehicle structural member is a trunk lid.

\* \* \* \* \*